United States Patent
Tola

(10) Patent No.: US 7,017,433 B2
(45) Date of Patent: Mar. 28, 2006

(54) NON-CONTACTING SENSOR MULTICHIP MODULE WITH INTEGRAL HEAT-SINKS

(75) Inventor: Jeffrey Tola, Upland, CA (US)

(73) Assignee: SSI Technologies, Inc., Janesville, WI (US)

(*) Notice: Subject to any disclaimer, the term of this patent is extended or adjusted under 35 U.S.C. 154(b) by 0 days.

(21) Appl. No.: 10/265,304

(22) Filed: Oct. 4, 2002

(65) Prior Publication Data

US 2003/0086477 A1    May 8, 2003

Related U.S. Application Data

(60) Provisional application No. 60/327,078, filed on Oct. 4, 2001.

(51) Int. Cl.
*G01D 21/00* (2006.01)
(52) U.S. Cl. ............ 73/866.1; 361/690; 361/707; 361/715; 439/877; 374/208
(58) Field of Classification Search ............. 374/208; 439/877; 73/866.5, 866.1, 431, 493, 494; 250/231.13, 239; 361/690, 707, 715, 687, 361/810; 324/207.2, 207.21, 251, 252, 173, 324/174; 29/595; 310/DIG. 3
See application file for complete search history.

(56) References Cited

U.S. PATENT DOCUMENTS

| | | | | |
|---|---|---|---|---|
| 4,301,682 A | * | 11/1981 | Everest | 374/133 |
| 4,404,813 A | * | 9/1983 | Paddock et al. | 374/208 |
| 4,728,834 A | | 3/1988 | Kumar et al. | |
| 4,847,527 A | * | 7/1989 | Dohogne | 324/207.2 |
| 4,890,059 A | * | 12/1989 | Guentner | 324/174 |
| 4,923,179 A | * | 5/1990 | Mikolajczak | 361/710 |
| 4,975,766 A | * | 12/1990 | Umezawa | 257/714 |
| 4,996,909 A | * | 3/1991 | Vache et al. | 374/208 |
| 5,021,736 A | * | 6/1991 | Gonsalves et al. | 324/252 |
| 5,179,506 A | * | 1/1993 | Corbett et al. | 361/807 |
| 5,216,581 A | * | 6/1993 | Fisher et al. | 361/728 |
| 5,276,587 A | * | 1/1994 | Ciaccio | 361/707 |
| 5,451,868 A | * | 9/1995 | Lock | 324/207.2 |
| 5,508,611 A | * | 4/1996 | Schroeder et al. | 324/252 |

(Continued)

FOREIGN PATENT DOCUMENTS

DE         43 05 439        8/1994

(Continued)

OTHER PUBLICATIONS

Engineering Drawing P-1250.3—Fuel Level Sensor, Illustrating product available to public prior to Oct., 2002.

(Continued)

*Primary Examiner*—Diego Gutierrez
*Assistant Examiner*—Stanley J. Pruchnic, Jr.
(74) *Attorney, Agent, or Firm*—Michael Best & Friedrich LLP

(57) ABSTRACT

A sensor assembly having a housing including a first portion and a second portion. One of the portions of the housing includes a plurality of walls. The walls at least partially define a chamber. The assembly also includes a hinge connected to the first portion and to the second portion. The second portion is pivotable about the hinge from an open position with respect to the first portion to a closed position with respect to the first portion. The assembly also includes a sensor positioned within the chamber and substantially encircled by the plurality of walls. The sensor is partially enclosed by the first portion and second portion when the second portion is in the closed position.

41 Claims, 4 Drawing Sheets

U.S. PATENT DOCUMENTS

| | | | |
|---|---|---|---|
| 5,631,557 A * | 5/1997 | Davidson | 324/174 |
| 5,742,159 A | 4/1998 | Babin et al. | |
| 5,744,951 A | 4/1998 | Babin et al. | |
| 5,745,347 A * | 4/1998 | Miller et al. | 361/813 |
| 5,912,556 A | 6/1999 | Frazee et al. | |
| 5,923,032 A * | 7/1999 | Carlson et al. | 250/239 |
| 5,963,028 A * | 10/1999 | Engel et al. | 324/207.2 |
| 5,991,652 A * | 11/1999 | Barthelemy et al. | 374/208 |
| 6,128,191 A * | 10/2000 | Bell et al. | 361/720 |
| 6,133,729 A * | 10/2000 | Mierzwinski | 324/207.2 |
| 6,195,261 B1 * | 2/2001 | Babutzka et al. | 361/752 |
| 6,225,716 B1 | 5/2001 | Sies et al. | |
| 6,292,685 B1 * | 9/2001 | Pompei | 374/132 |
| 6,351,116 B1 * | 2/2002 | Bolda et al. | 324/251 |
| 6,497,035 B1 * | 12/2002 | Ratliff | 324/207.2 |
| 6,737,863 B1 * | 5/2004 | Aoki et al. | 324/173 |
| 6,756,780 B1 * | 6/2004 | Hagio et al. | 324/207.25 |
| 6,769,319 B1 * | 8/2004 | McDonald et al. | 73/866.1 |
| 2003/0041437 A1 * | 3/2003 | Williams et al. | 29/595 |

FOREIGN PATENT DOCUMENTS

| | | |
|---|---|---|
| DE | 296 06 042 U | 6/1996 |
| EP | 0 891 914 A | 1/1999 |

OTHER PUBLICATIONS

SSI Technologies Solid-State, Active Speed Sensors Brochure, Illustrating product available to public prior to Oct. 4, 2000 (1 page).

SSI Technologies Cabled VR, Solid-State ABS Wheel Sensors Brochure, Illustrating product available to public prior to Oct. 4, 2000 (1 page).

* cited by examiner

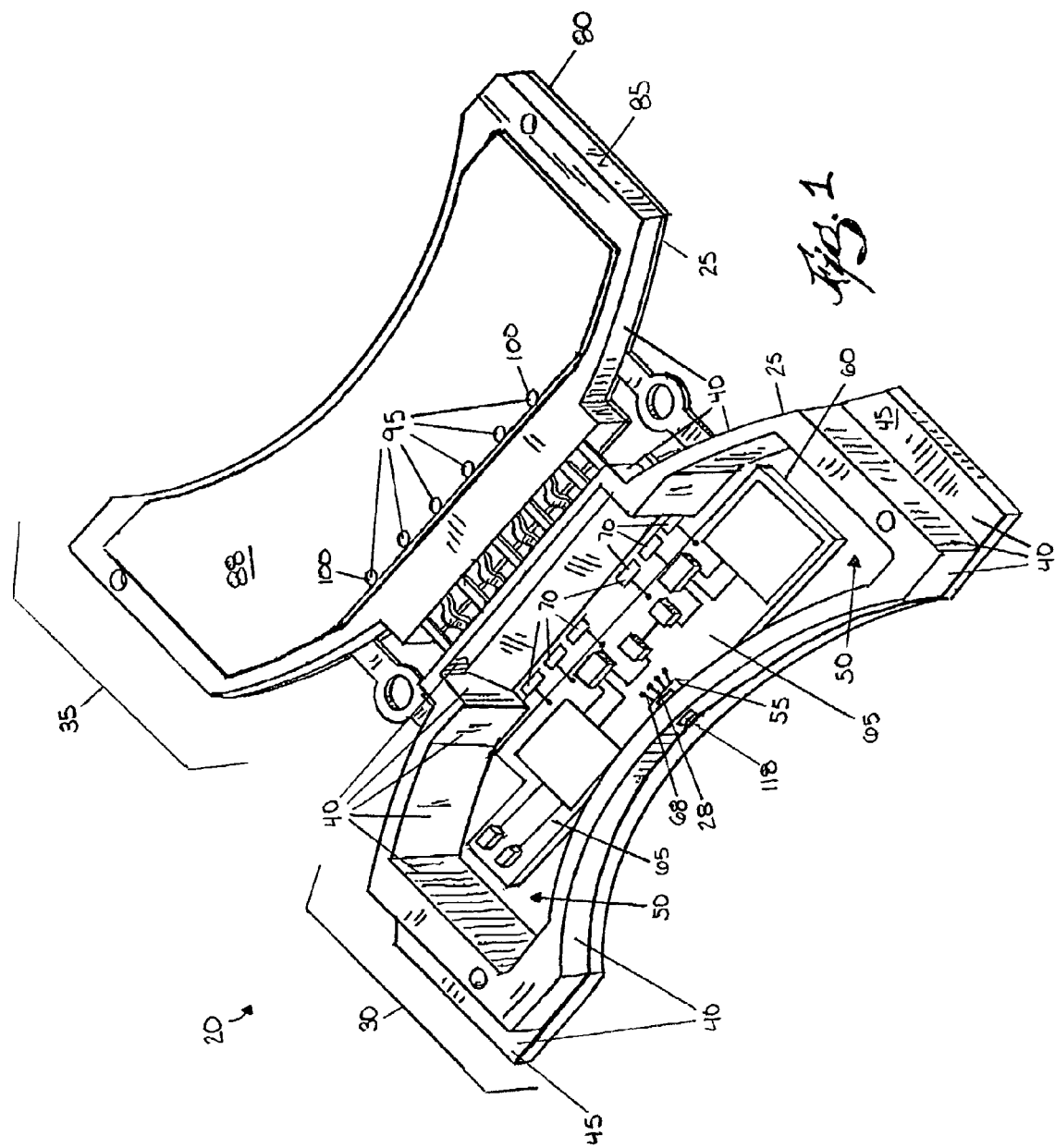

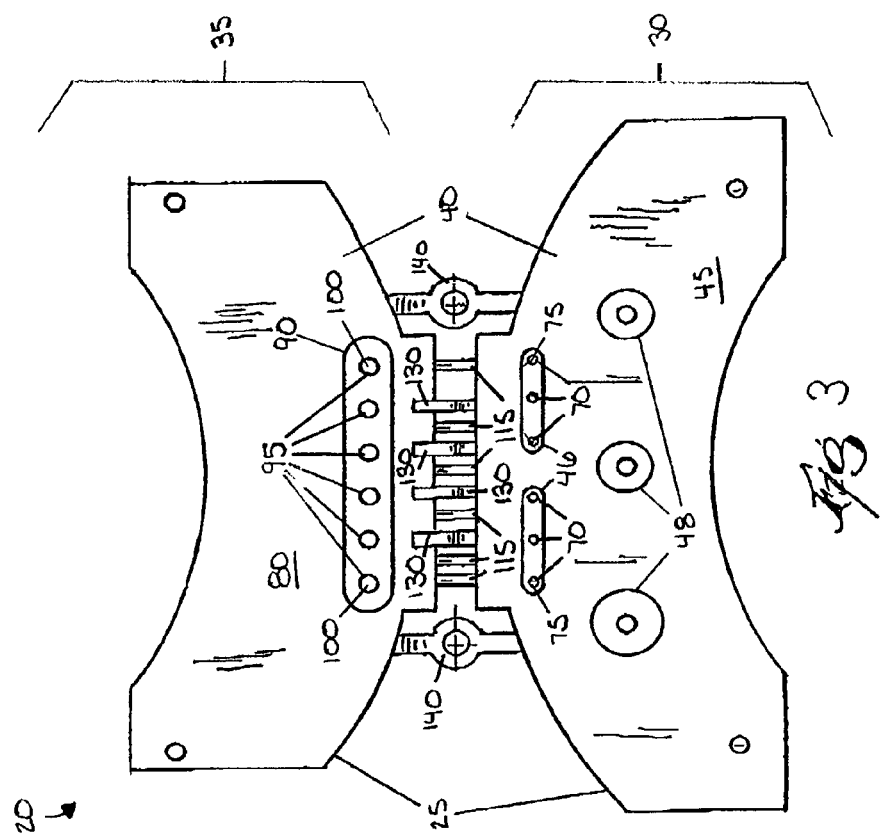
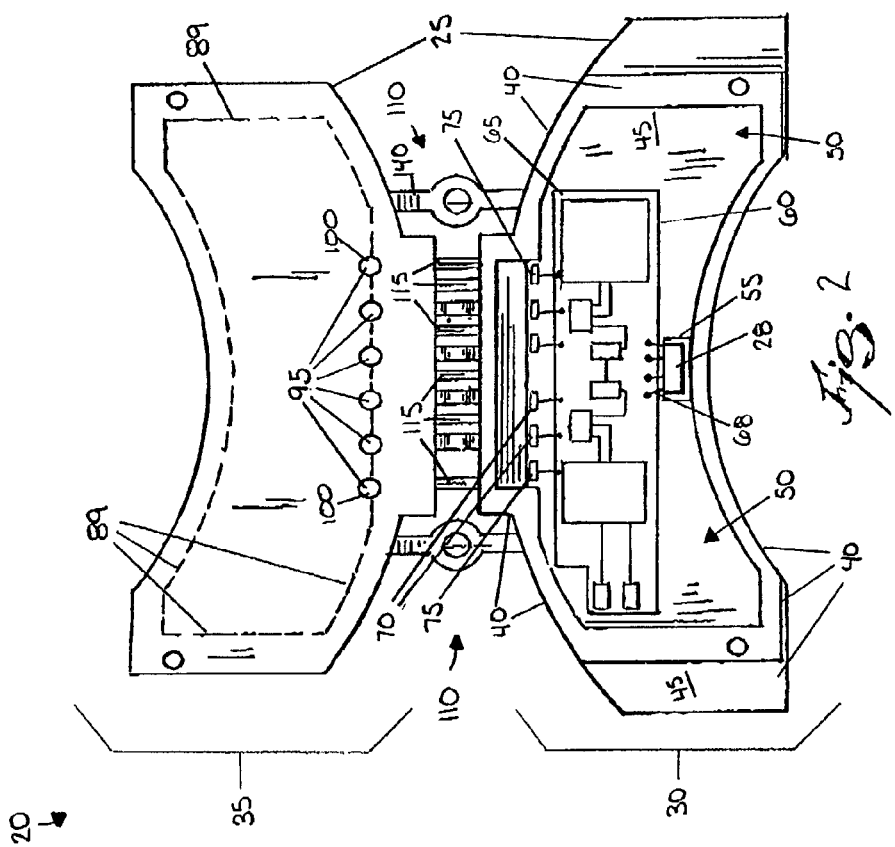

NON-CONTACTING SENSOR MULTICHIP MODULE WITH INTEGRAL HEAT-SINKS

RELATED APPLICATIONS

This patent application claims the benefit of U.S. Provisional Patent Application No. 60/327,078, entitled "NON-CONTACTING SENSOR MULTICHIP MODULE WITH INTEGRAL HEAT SINKS," filed on Oct. 4, 2001, the entire content of which is incorporated herein by reference.

BACKGROUND OF THE INVENTION

Non-contacting sensor assemblies include sensors that generate change to an electronically interrogated physical parameter that is proportional to the movement of a sensed element attached to the sensor or to a sensed element in close proximity to the sensor. This change is achieved without physical contact between the sensed element and the sensor. In magnetic position sensing, the magnitude or position of magnetic field intensity is generally measured by an appropriate measuring sensor or device, such as a Hall sensor or Magneto-resistive sensor. In all non-contacting sensor assemblies, precise location of the interrogating component or sensor, relative to the sensor assembly and sensed element, is required. Signal quality and accuracy is always dependent on the distance of the sensor from the sensed element.

Recent advances in integrated circuit ("IC") technology have offered enhanced sensor performance through the integration of digital signal processing techniques directly into the sensor assembly. Many times the inclusion of the signal processing components (i.e., an IC) with the sensor will require separate packages or assemblies to manage process incompatibility, sourcing complexity and thermal management considerations. Often, semiconductor based components are pre-packaged in industry standard forms. These forms are targeted primarily at traditional electronics manufacturers using primarily flat planar processing formats, such as printed circuit boards and ceramic hybrid circuits. Multiple sensor assemblies will lead to large installation space requirements, complicated circuitry for connecting the assemblies and large or difficult tolerances for sensor location.

Furthermore, fabrication of conventional sensor assemblies are often expensive and inefficient. Since precise location of the sensor relative to the sensor assembly and sensed element is often required for the sensor to operate effectively and accurately, proper positioning the sensor within the assembly can be a difficult and/or time consuming task. In many cases, manufacturing tolerances regarding the position of the sensor on the integrated circuit need to be carefully controlled for maintaining precise sensor locations. In turn, manufacturing tolerances regarding the position of the integrated circuit within the housing of the assembly also typically need to be carefully controlled. As a result, the fabrication process of conventional sensor housings can become lengthy and expensive.

SUMMARY OF THE INVENTION

In some embodiments of the present invention, a sensor assembly is provided for housing both an integrated circuit and a sensor and for providing a flexible sensor location. The sensor assembly can have a housing with a first portion and a second portion. At least one of the portions includes a plurality of walls at least partially defining a chamber. The assembly can also include a hinge connected to the first portion and to the second portion, wherein the second portion is pivotable about the hinge from an open position with respect to the first portion to a closed position with respect to the first portion. The assembly can also include a sensor located within the chamber when the second portion is in the closed position.

In some embodiments, the invention provides a sensor assembly having a housing with a plurality of walls which at least partially define a chamber, at least one of the walls having an internal surface. The assembly also includes a sensor mount located on an internal surface of a wall and a sensor mounted to the sensor mount. The assembly can further include an integrated circuit located substantially within the chamber of the housing and electrically coupled to the sensor.

The invention also provides methods of assembling a sensor assembly. In some embodiments, the method includes connecting a hinge between a first portion of the housing to a second portion of the housing. The first and second portions of the housing define a chamber from a plurality of walls. The method also includes positioning a sensor within the chamber of the housing, manipulating the hinge to move the second portion of the housing from an open position with respect to the first portion of the housing to a closed position with respect to the first portion of the housing, and at least partially enclosing the sensor within the housing by moving the second portion of the housing to the closed position.

In some embodiments, the method includes mounting an integrated circuit on an integrated circuit mounting location within the housing of the assembly and selecting a sensor mounting location from a plurality of sensor mounting locations within the housing. The method can also include mounting a sensor on the selected sensor mounting location independent of the integrated circuit mounting location and coupling the sensor to the integrated circuit such that the sensor and integrated circuit are in electrical communication.

Other features and advantages of the invention will become apparent by consideration of the detailed description and accompanying drawings.

BRIEF DESCRIPTION OF THE DRAWINGS

In the drawings:

FIG. 1 is a perspective view of a sensor assembly in a first embodiment.

FIG. 2 is a plan view of the sensor assembly as shown in FIG. 1.

FIG. 3 is a bottom view of the sensor assembly as shown in FIG. 1

Figure 4:
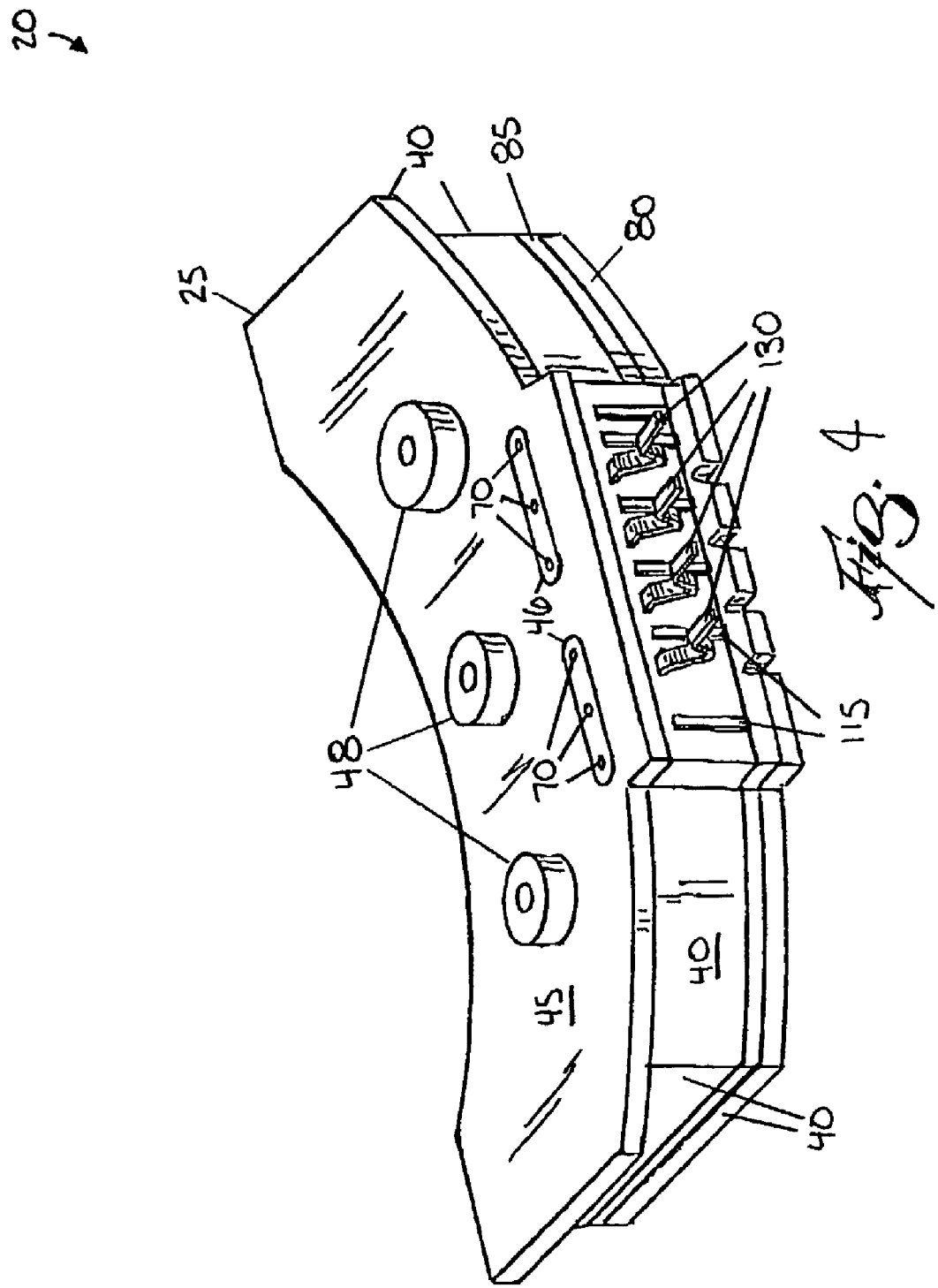
FIG. 4 is another perspective view of the sensor assembly.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

DETAILED DESCRIPTION

A first embodiment of a sensor assembly 20 is shown in FIGS. 1–4. The sensor assembly 20 includes a housing 25. In the embodiment shown, the housing 25 has a crescent shape. The housing 25 is crescent-shaped in order to position a sensor 28, such as a non-contacting rotary speed or position sensor, within the vicinity of a sensed element (not shown), such as a rotating shaft. In some embodiments, the sensor 28 is a Magneto-resistive sensor or is a torque sensor configured to sense the position of a vehicle steering column (not shown) or the flex of the steering column. In other embodiments, the sensor 28 is employed to sense vehicle transmission speed, vehicle wheel speed, or other parameters either in or outside of the automotive field. In some embodiments, the sensor 28 is an optical sensor and is employed to sense daylight, infra-red light, ultraviolet light, the motion of an object, the speed of an object, the proximity of an object, or any other suitable parameter. In some embodiments, the sensor 28 is a sound sensor, temperature sensor, accelerometer, impact sensor, radiation sensor or another type of sensor.

The housing 25 can have any shape desired, such as a rectangular shape, a circular shape or another geometric shape. In some embodiments, the shape of the housing 25 is independent of the application of the sensor 28. In other embodiments, the shape of the housing 25 is dependent on the application of the sensor 28.

The housing 25 includes a first portion 30 and a second portion 35. The first portion 30 and the second portion 35 collectively include a plurality of walls 40 defining a chamber 50. The plurality of walls 40 includes a base wall or plate 45. In the embodiment shown, the plate 45 is included in the first portion 30 of the housing 25. The plate 45 is a heat sink comprising aluminum. In other embodiments, the plate 45 comprises thermally conductive plastic, other synthetic material or another metal, such as copper. In other embodiments, a heat sink at least partially defines at least one wall of the plurality of walls 40. In the illustrated embodiment, the base wall 45 is a heat sink. In some embodiments, the heat sink at least partially defines a side wall of the plurality of walls 40. In other embodiments, the heat sink can be any portion or portions thereof included in the housing 25.

In the embodiment shown, the plate 45 comprises metal and the remaining walls of the plurality of walls 40 included in the first portion 30 are an integral plastic structure, which is molded to the base wall 45. The plurality of walls 40 can also be attached or fastened to the base wall 45. The base wall 45 and the plurality of walls 40 can also be a single unit. In other embodiments, the plurality of walls 40 can comprise a different material or the same material as the plate 45. The plurality of walls 40 can also be formed as separate walls. The plurality of walls 40 can also include more or fewer walls than the embodiment shown. In further embodiments, the first portion 30 of the housing can be an single unit of metal, plastic or another suitable material.

The plate 45 includes an aperture or a first set of apertures 46 as shown in FIG. 3 and as will be more fully discussed below. The plate 45 also includes one or more mounting discs 48 for mounting the assembly 20 to a mounting surface (not shown). In some embodiments, the mounting discs 48 are partially or entirely made of plastic or rubber and are inserted into and are sized and shaped to mate with one or more receiving apertures (not shown) defined by the mounting surface. Also, in some embodiments the mounting discs 48 are located on any one or more other external surfaces of the housing 25.

The plurality of walls 40 included in the first portion 30 partially define the chamber 50. The chamber 50, as used herein, refers to an area either fully enclosed, partially enclosed, or substantially enclosed by the plurality of walls 40. In some embodiments, the chamber 50 is partially enclosed, while in other embodiments, the chamber 50 is fully enclosed. The internal surfaces of the plurality of walls 40 define a plurality of sensor mounting locations or sensor mounts in the housing 25. In some embodiments, a sensor mount can be a recess or receptacle in a surface of a wall of the plurality of walls 40 in which at least part of the sensor is received and can be secured. In the embodiment shown, a sensor mount 55 included in the plurality of sensor mounts is located within the chamber 50 on one internal surface of a wall of the plurality of walls 40. In this embodiment, the sensor 28 mounts to the sensor mount 55. In some embodiments, the plurality of sensor mounts can include a pad, block or an element integral with the surface or attached to the surface of a wall in the plurality of walls 40 in any manner and upon which the mount can be secured. In some embodiments, the plurality of sensor mounts can include dedicated locations on one or more walls 40 or heat sink. The location (e.g., sensor mount 55) can be shaped or adapted in a particular manner to secure or retain the sensor 28. In other embodiments, the plurality of sensor mounts has at least one or more sensor mounts which are not defined by the internal surfaces of the plurality of walls 40, such as one or more pads, bosses, or other elements attached to the surfaces of the plurality of walls and to which the sensor 28 can be mounted. In some embodiments, any number of sensors can be mounted to any number of sensor mounts on the walls 40 and/or heat sinks of the housing 25. In the embodiment shown, the sensor mount 55 is selected from the plurality of sensor mounts to position the sensor 28 in an optimal location to sense a sensed element, such as a rotating shaft.

In the illustrated embodiment, an integrated circuit ("IC") mounting location or IC mount 60 is also located within the chamber 50. In this embodiment, the IC mount 60 is chosen or located independently of the sensor 28 and sensor mount 55 and is on the plate 45. In other embodiments, the IC mount 60 may be on another wall in the plurality of walls 40 and may be one IC mount of a plurality of IC mounts. An integrated circuit ("IC") 65 is positioned on the IC mount 60. In some embodiments, the IC 65 can be a single chip or several ICs electrically coupled or isolated on a single printed circuit board. The IC 65, in other embodiments, can also be two or more electrical components electrically coupled via leads or soldering (not shown). The sensor 28, which is located on the sensor mount 55 remote from the IC 65, electrically couples to the IC 65. Leads 68 are soldered or attached to both the sensor 28 and the IC 65. In other embodiments, the sensor 28 is adjacent to or in contact with the IC 65 and IC mount 60 while still mounted to the sensor mount 55. In the embodiment shown, the IC 65 includes two integrated circuits performing the same functions. This allows the IC 65 and sensor 28 to remain functioning in the event that one circuit malfunctions.

The first portion 30 of the housing 25 also includes a first set of terminals 70, which electrically couples to the IC 65 and is in electrical communication with the sensor 28. The first set of terminals 70 are adjacent to the first set of apertures 46 and thus, are accessible from outside the chamber 50 and housing 25. The first set of terminals 70 provides an electrical connection for accessing or transferring information from the IC 65 and sensor 28 to electrical components or devices (not shown) located outside the housing 25. In some embodiments, the first set of terminals 70 includes one or more terminals 75 (e.g., two in the illustrated embodiment) that allow an external device (not shown) to program the IC 65 and/or the sensor 28. In some embodiments, the remaining terminals of the first set of terminals 70 provide a connection for transmitting and/or receiving information from the IC 65 and sensor 28 to the external device. In other embodiments, there are more or fewer terminals in the first set of terminals 70 and more or fewer terminals capable of receiving programming instructions for the IC 65 and/or sensor 28. The terminals 70 can take a number of different forms, including without limitation, sockets, leads, wires, pins for connection to leads, jacks, female connectors, male connectors, cables, or other input/out ("I/O") ports.

In the embodiment shown, the plurality of walls 40 also includes a top wall or plate 80, which is included in the second portion 35 of the housing 25. The top plate 80 is also a heat sink comprising of aluminum. In other embodiments, the plate 80 comprises thermally conductive plastic or another metal, such as copper. In the embodiment shown, the second portion 35 of the housing 25 includes the plate 80, which comprises metal, and includes a plastic cap 85 attached to the plate 80. The cap 85 includes a ridge 88 which is slightly raised. The top plate 80 and cap 85 is of a shape that allows the top plate 80 to substantially cover the chamber 50 and allows the cap 85 to partially extend into the chamber 50 when the second portion 35 is in a closed position, as will be more fully discussed below. In other embodiments, the plate 80 and cap 85 are a single unit comprising metal, thermally conductive plastic, or other materials. In further embodiments, the plate 80 can include an additional plurality of walls (illustrated as the dotted lines 89 in FIG. 2) forming at least part of the chamber 50 or a larger chamber than chamber 50. The larger chamber (not shown) can allow additional ICs, sensors or electronic components to be mounted on the second portion 35 of the housing 25, as well as the first portion 30 of the housing 25. In the embodiment shown, the top plate 80 also includes an aperture or a second set of apertures 90 as shown in FIG. 3 and as will be more fully discussed below. In some embodiments, the arrangement of the plurality of walls 40 differs from the arrangement illustrated in FIGS. 1–4 (e.g., the plurality of walls 40 are located on the first portion 30 of the housing 25, the plurality of walls 40 are located on the second portion 35 of the housing 25, one or more walls of the plurality of walls 40 are located within one portion 30 or 35 of the housing while the remaining walls of the plurality of walls 40 are located within the other portion 35 or 30, and the like).

The second portion 35 of the housing 25, in the illustrated exemplary embodiment, also includes a second set of terminals 95, which is in electrical communication with the IC 65 and sensor 28. In other embodiments where the second portion 35 of the housing 25 includes additional electrical components, the second set of terminals 95 are capable of being coupled to those additional components (not shown). The second set of terminals 95 are adjacent to the second aperture 90 and thus, is accessible from outside the chamber 50 and housing 25. The second set of terminals 95 also provides an electrical connection for accessing or transferring information from the IC 65, sensor 28 or additional electrical components (if applicable) to electrical components or devices (not shown) located outside the housing 25. In some embodiments, the second set of terminals 95 includes one or more terminals 100 (e.g., two in the illustrated embodiment) that allow an external device (now shown) to program the IC 65, the sensor 28, and/or additional electrical components (if applicable). In some embodiments, the remaining terminals of the second set of terminals 95 provide connections for transmitting and/or receiving information from the IC 65, the sensor 28 and/or additional electrical components (if applicable) to the external device. In other embodiments, there may be more or fewer terminals in the second set of terminals 95 and more or fewer terminals capable of receiving programming instructions for the electrical components 28 and 65. The terminals 100 can take a number of different forms, including without limiting, sockets, leads, wires, pins for connection to leads, jacks, female connectors, male connectors, cables, or other input/out ("I/O") ports.

The housing 25 further includes a hinge 110 which connects the first portion 30 of the housing 25 to the second portion 30 of the housing 25. The hinge 110 allows the second portion 35 of the housing 35 to pivot about the hinge 110 from a first or open position with respect to the first portion 30 of the housing, as illustrated in FIGS. 1–3, to a second or closed position with respect to the first portion 30, as illustrated in FIG. 4. In the closed position, the first portion 30 and second portion 35 substantially enclose the elements within the first portion 30 and second portion 35. In some embodiments, prior to the housing 25 pivoting into the closed position, the chamber 50 is at least partially filled with a thermally conductive material (not shown). The thermally conductive material is in thermal communication with the IC 65 and at least one of the heat sinks 45 or 80. In some embodiments, the IC 65 is mounted to a heat sink, and heat generated from the IC 65 is transferred directly to the heat sink. In other embodiments where the IC 65 is not directly mounted to a heat sink or the heat sink is located a distance from the IC 65, the heat generated from the IC 65 is indirectly transferred to the heat sink, such as through one or more walls of the plurality of walls 40 or through the thermally conductive material within the chamber 50.

In some embodiments, the hinge 110 includes a plurality of leads 115. In the embodiment shown, the plurality of leads 115 includes a lead associated with a terminal from the first set of terminals 70 and a terminal from the second set of terminals 95. The plurality of leads 115 electrically couples the first set of terminals 70 to the second set of terminals 95. The plurality of leads 115 are deformable such that the second portion 35 of the housing 25 is pivotable about the leads 115 from the open position to the closed position, thereby at least partially defining the hinge 110 of the housing 25. In some embodiments, the plurality of leads 115 comprises copper. In other embodiments, the plurality of leads comprises a material suitable for conducting electricity.

In some embodiments, the hinge 110 includes one or more bars 140 (e.g., two in the illustrated embodiment) or other elements connecting the first and second portions 30, 35 of the housing, such as when the housing portions 30, 35 are stamped, machined, pressed, cut, or otherwise manufactured from a single plate or other element. The bars 140 are deformable or can otherwise be manipulated so that the second portion 35 of the housing 25 is pivotable to the first portion 30 (or vice versa). Accordingly, the bars 140 at least partially define the hinge 110 of the housing 25. In some embodiments, one or more bars 140 assist the leads 115 of the hinge 110 in the pivoting motion described above, and can be removed from the housing 25 after the housing 25 has been closed.

The housing 25 can also include an indicator or datum 118. In some embodiments, the datum 118 is an indicator located on an external surface of a wall of the plurality of walls 40 and is associated with the position of the sensor mount 55 and sensor 28 within the housing 25. The datum 118 provides an indication of the location or position of the sensor mount 55. The assembly 20 can therefore be mounted to a mounting surface (not shown) or can otherwise be positioned with respect to the element or area to be sensed based upon the location of the datum 118, thereby properly orienting the location of the sensor mount 55 (and, in turn, the location of the sensor 28) with respect to an object or area to be sensed (e.g., the sensed element). The datum 118 can therefore provide a more accurate method of positioning the sensor 28 in the vicinity of a sensed element (not shown). In some embodiments, the datum 118 is a marking, groove, or other visual indicator located on an outside surface of a wall of the plurality of walls 40.

In some embodiments the assembly 20 further includes a plurality of external terminals 130. The plurality of external terminals 130 electrically couples to the first and second sets of terminals 70 and 95 and is in electrical communication with the IC 65 and sensor 28. The plurality of external terminals 130 extend from the housing 25 through a plurality of apertures (not shown) in a wall of the plurality of walls 40. The external terminals 130 allow an external device, such as a ribbon cable, wires, I/O ports, female plugs, or other suitable electrical devices, to communicate with the IC 65 and sensor 28 and to transmit and/or receive information from the IC 65 and sensor 28.

During fabrication of the assembly 20 in some embodiments, the first portion 30 of the housing 25 and the second portion 35 of the housing are in the open position. The sensor mount 55 is selected from the plurality of sensor mounts, and the IC mount 60 is selected from the plurality of sensor mounts, if applicable. The sensor 28 is mounted to the sensor mount 55, and the IC 65 is mounted on the IC mount 60. The required electrical connections between the sensor 28, the IC 65, the first and second sets of terminals 70 and 95, and the set of external terminals 130 are made. Once the components are positioned and the required electrical connections are made, the leads 115 of the hinge 110 are deformed such that the second portion 35 of the housing 25 pivots into the closed position.

Figure 5:
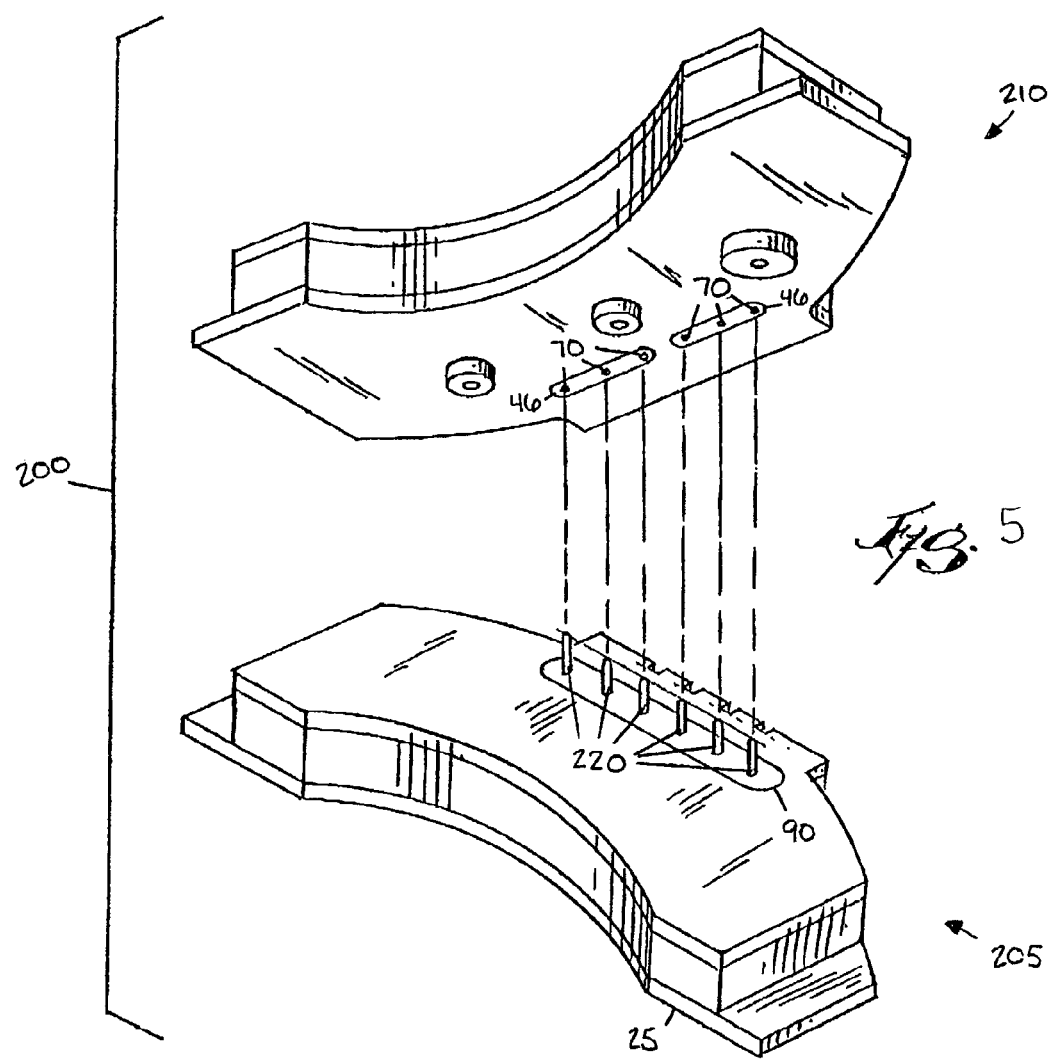
FIG. 5 is a perspective view of a sensor assembly in a second embodiment.

Another embodiment of the present invention is shown in FIG. 5. A first sensor assembly 200 and a second sensor assembly 210 include the same features and elements as the sensor assembly 20 shown in FIGS. 1–4. However, the first sensor assembly 200 includes a plurality of external connectors 220. The plurality of external connectors 220 extend from the second aperture 90 of the housing 25 and electrically couples to the second set of terminals 95. The plurality of external connectors 220 also extend into the apertures 46 of the second housing assembly 210, when the second housing assembly 210 is stacked on top of the first housing assembly, and electrically couples to the first set of terminals 70. The plurality of external connectors 220 provide electrical communication between the integrated circuits 65 and sensors 28 located in each sensor assembly 200 and 210.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. Various features and advantages of the invention are set forth in the following claims.

What is claimed:

1. A sensor assembly comprising:
   a housing having a first portion and a second portion together at least partially defining a chamber;
   a hinge connecting to the first portion and the second portion, the second portion being pivotable about the hinge from an open position with respect to the first portion to a closed position with respect to the first portion; and
   a sensor element located within the chamber and mounted to the first portion, the second portion of the housing movable with respect to the first portion and to the sensor element mounted to the first portion, wherein the sensor element is mounted to the first portion independently of movement of the second portion;
   wherein the hinge is defined at least in part by an electrical lead deformable to pivot the second portion from the open position to the closed position.

2. The sensor assembly as set forth in claim 1 and further comprising an integrated circuit within the chamber.

3. The sensor assembly as set forth in claim 2 and further comprising a heat sink in thermal communication with the integrated circuit.

4. The sensor assembly as set forth in claim 3 wherein the heat sink defines at least one wall of the housing.

5. The sensor assembly as set forth in claim 4 wherein the heat sink is a metal plate.

6. The sensor assembly as set forth in claim 4 wherein the heat sink comprises aluminum.

7. The sensor assembly asset forth in claim 2 and further comprising a first terminal coupled to the integrated circuit, the first terminal positioned within the first portion of the housing and located adjacent to a first aperture of a first wall of the housing, the first terminal being accessible from outside the chamber through the first aperture.

8. The sensor assembly as set forth in claim 7 wherein the electrical lead is in electrical communication with the first terminal and with the integrated circuit.

9. The sensor assembly as set forth in claim 7 and further comprising a second terminal coupled to the integrated circuit, the second terminal positioned within the second portion of the housing and located adjacent to a second aperture of a second wall of the housing, the second terminal being accessible from outside the chamber through the second aperture.

10. The sensor assembly as set forth in claim 9 wherein the electrical lead is in electrical communication with the first terminal, the second terminal and the integrated circuit.

11. The sensor assembly as set forth in claim 9 and further comprising:
    a third terminal on the first portion of the housing and electrically coupled to the integrated circuit, the third terminal located adjacent to the first aperture of the first wall and being accessible from outside the chamber through the first aperture by an external device; and
    a fourth terminal on the second portion of the housing and electrically coupled to the integrated circuit, the fourth terminal located adjacent to the second aperture of the second wall and being accessible from outside the chamber through the second aperture by an external device; and
    wherein the integrated circuit and sensor element are operable to be programmed through the third terminal and the fourth terminal.

12. The sensor assembly as set forth in claim 2 and further comprising:

a first terminal on the first portion of the housing and electrically coupled to the integrated circuit, the first terminal located adjacent to a first aperture of a first wall of the housing and being accessible from outside the chamber through the first aperture by an external device; and a second terminal on the second portion of the housing and electrically coupled to the integrated circuit, the second terminal located adjacent to a second aperture of a second wall of the housing and being accessible from outside the chamber through the second aperture by an external device; and wherein the integrated circuit and sensor element are operable to be programmed through the first terminal and the second terminal.

13. The sensor assembly as set forth in claim 2 wherein at least one of the first portion and the second portion has a sensor mount, the sensor element being mounted on the sensor mount and the integrated circuit being positioned within the chamber and electrically coupled to the sensor element.

14. The sensor assembly as set forth in claim 2 and further comprising an external terminal extending through an aperture in a wall of the housing, the external terminal electrically coupled to the integrated circuit.

15. The sensor assembly as set forth in claim 2 wherein at least one of the first portion and the second portion has a sensor mount, the sensor element being mounted on the sensor mount, and the sensor mount having a first location; and wherein at least one of the first portion and the second portion has an integrated circuit mount, the integrated circuit being positioned on the integrated circuit mount, and the integrated circuit mount having a second location, the second location being independent of the first location.

16. The sensor assembly as set forth in claim 1 wherein the first portion further includes a first heat sink and the second portion further includes a second heat sink.

17. The sensor assembly as set forth in claim 16 wherein the first heat sink and second heat sink are plates at least partially defining the chamber.

18. The sensor assembly as set forth in claim 1 and further comprising an external terminal extending through an aperture in a wall of the housing, the external terminal electrically coupled to the sensor element.

19. The sensor assembly as set forth in claim 1 wherein the chamber is at least partially filled with thermally conductive material.

20. A sensor assembly comprising:

a housing having a plurality of walls, a first portion and a second portion coupled with a hinge, the second portion being pivotable via the hinge from an open position relative to the first portion to a closed position relative to the first portion, the plurality of walls at least partially defining a chamber within the housing, a wall of the plurality of walls having an internal surface;

a sensor element;

a plurality of sensor mounts located on at least one internal surface of at least one of the walls, each of the plurality of sensor mounts having a respective predetermined location in the housing and at least partially defining a different respective position for the sensor element in the housing, wherein the sensor element is mounted to a sensor mount selected from the plurality of sensor mounts; and an integrated circuit located substantially within the chamber of the housing, the integrated circuit electrically coupled to the sensor element, wherein the hinge is at least partially defined by a deformable electrical lead, the lead electrically coupled to the integrated circuit and the first terminal.

21. The sensor assembly as set forth in claim 20 wherein the plurality of sensor mounts includes first and second sensor mounts, the first and second sensor mounts located on one of a common wall of the plurality of walls and different walls of the plurality of walls.

22. The sensor assembly as set forth in claim 20 wherein the housing further includes a heat sink, the heat sink at least partially defining a wall of the plurality of walls of the housing.

23. The sensor assembly as set forth in claim 22 wherein the sensor mount is adjacent to the heat sink.

24. The sensor assembly as set forth in claim 22 wherein the heat sink comprises metal.

25. The sensor assembly as set forth in claim 24 wherein the heat sink comprises aluminum.

26. The sensor assembly as set forth in claim 20 wherein the first portion and the second portion at least partially enclose the sensor element and integrated circuit when the second portion is in the closed position.

27. The sensor assembly as set forth in claim 20 and further comprising a first terminal electrically coupled to the integrated circuit, the first terminal extending through a first aperture of a wall of the plurality of walls.

28. The sensor assembly as set forth in claim 20 and further comprising a first terminal electrically coupled to the integrated circuit, the first terminal adjacent to a first aperture of a wall of the plurality of walls, the first terminal being accessible outside the housing through the first aperture by an external device, wherein the first terminal is a programming terminal.

29. The sensor assembly as set forth in claim 28 wherein the first terminal is a programming terminal by which the integrated circuit is programmable.

30. The sensor assembly as set forth in claim 20 and further comprising:

a first terminal electrically coupled to the integrated circuit, the first terminal positioned adjacent to a first aperture defined by a wall of the plurality of walls.

31. The sensor assembly as set forth in claim 20 wherein the chamber is at least partially filled with a thermally conductive material in heat transfer relationship with the integrated circuit.

32. The sensor assembly as set forth in claim 20 wherein a first wall of the plurality of walls includes a heat sink.

33. The sensor assembly as set forth in claim 32 wherein a portion of the first wall is a heat sink.

34. The sensor assembly as set forth in claim 20 and further comprising a datum on the housing, the datum corresponding to a location of the sensor mount on the housing.

35. The sensor assembly as set forth in claim 34 wherein the datum is a visual indicator located on an outside surface of a wall.

36. A method of assembling a sensor assembly, the sensor assembly having a housing, the method comprising:

connecting a hinge at least partially defined by an electrical lead between a first portion of a housing and a second portion of the housing, the first portion and the second portion at least partially defining a chamber within the housing;

positioning a sensor element within the chamber;

mounting the sensor element to the first portion of the housing;

deforming the electrical lead of the hinge to move at least one of the first and second portions of the housing with respect to the other of the first and second portions of the housing after mounting the sensor element to the first portion of the housing; and at least partially enclosing the sensor element within the housing by moving the at least one of the first and second portions of the housing.

37. The method as set forth in claim 36 wherein a wall of the housing is a heat sink.

38. The method as set forth in claim 37 wherein positioning the sensor element includes positioning the sensor element adjacent to the heat sink.

39. The method as set forth in claim 36 and further comprising positioning an integrated circuit upon one of the first portion and the second portion.

40. The method as set forth in claim 36 and further comprising positioning a datum on the housing, the datum having a location on the housing and indicating a location of the sensor element within the housing.

41. The method as set forth in claim 40 and further comprising positioning the sensor assembly to a mounting surface based on the location of the datum.

* * * * *